INVENTOR
PAUL C. WEISS

INVENTOR
PAUL C. WEISS

United States Patent Office 3,615,056
Patented Oct. 26, 1971

3,615,056
REMOTE CONTROL ELECTRIC
ACTUATING DEVICE
Paul C. Weiss, Evanston, Ill., assignor to AMBA
Industries Incorporated, Garden City, N.Y.
Original application Aug. 9, 1968, Ser. No. 751,446, now
Patent No. 3,549,120. Divided and this application May
12, 1970, Ser. No. 36,645
Int. Cl. A01c *19/00;* E01c *19/20*
U.S. Cl. 239—677
4 Claims

ABSTRACT OF THE DISCLOSURE

Electrically controlled hydraulic valve arrangements with integral hydraulic override whereby the flow of fluid through one valve controls in part the operation of the other valve; the two valves being connected to operate different hydraulically driven motors connected respectively to a conveyor mechanism and a spreader mechanism for distribution of sand or aggregate.

---

This application is a division of applicant's copending application, Ser. No. 751,446, filed Aug. 9, 1968 and entitled "Remote Control Electric Actuating Device," now Pat. No. 3,549,120, granted Dec. 22, 1970, which was a division of applicant's application, Ser. No. 581,263, filed Sept. 22, 1966 and entitled "Remote Control Electric Actuating Device," now Pat. No. 3,429,232, issued Feb. 25, 1969.

This invention relates to remote control systems and more particularly it concerns the accurate control of mechanical equipment from a remote location.

The present invention is particularly useful in connection with spreader machinery of the type used to spread sand, salt or other solid aggregate material over various surfaces such as roads, fields, etc. Such machinery is usually pulled along on or by a truck or tractor, and utilizes hydraulic power from the truck or tractor to operate various material feed and spreader elements.

A typical spreader comprises a hopper in which the aggregate material is stored, a conveying device, such as an auger, for feeding material from the hopper, and a spreader which usually takes the form of a rotating blade which distributes the material by throwing it in an outward direction.

Because of variations in the nature and condition of the surface being covered and because of variations in the consistency of the aggregate material being spread, it is necessary to maintain continuous control of material feed to the spreader and of spreader blade speed. The material feed affects the density or thickness of spreading while the spreader blade speed affects the extent or distance of spreading.

Spreader machinery is best controlled hydraulically since with hydraulics it is possible to obtain accurate control of both conveyor speed (material feed), and blade speed substantially independently of load variations and therefore substantially independent of each other. However, this usually requires that the machine operator be located outside the truck or tractor since to move the hydraulic lines, even pilot lines into the truck cab would be unduly cumbersome, complex and expensive. On the other hand, operation of the controls from the machinery itself requires an extra worker in a particularly hazardous location.

Accordingly, it is an object of this invention to provide an improved remote control apparatus.

It is another object to provide remote control of hydraulically driven machinery.

It is a further object to permit complete and accurate control of spreader machinery from within the cab of a truck or tractor which moves the machinery along.

Yet, a further object of the invention is to provide a remote control system which permits independent control of different variables.

Another object is to provide positive remote selector control which is bi-directional in character.

Another object is to provide a load responsive hydraulic valve assembly.

A further object of the invention is to provide an improved hydraulic valve assembly permitting independent control of two variables.

Another object of the present invention is to provide a hydraulic valve assembly capable of providing independent control of two mechanisms from a single fluid power source while maintaining a minimum flow priority to one of the mechanisms.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended thereto. Those skilled in the art will appreciate that the conception upon which this disclosure is based may readily be utilized as a basis for the designing of other structures for carrying out the several purposes of the invention. It is important, therefore, that the claims be regarded as including such equivalent constuctions as do not depart from the spirit and scope of the invention.

Certain specific embodiments of the invention have been chosen for purposes of illustration and description, and are shown in the accompanying drawings, forming a part of the specification, wherein.

Figure 1:
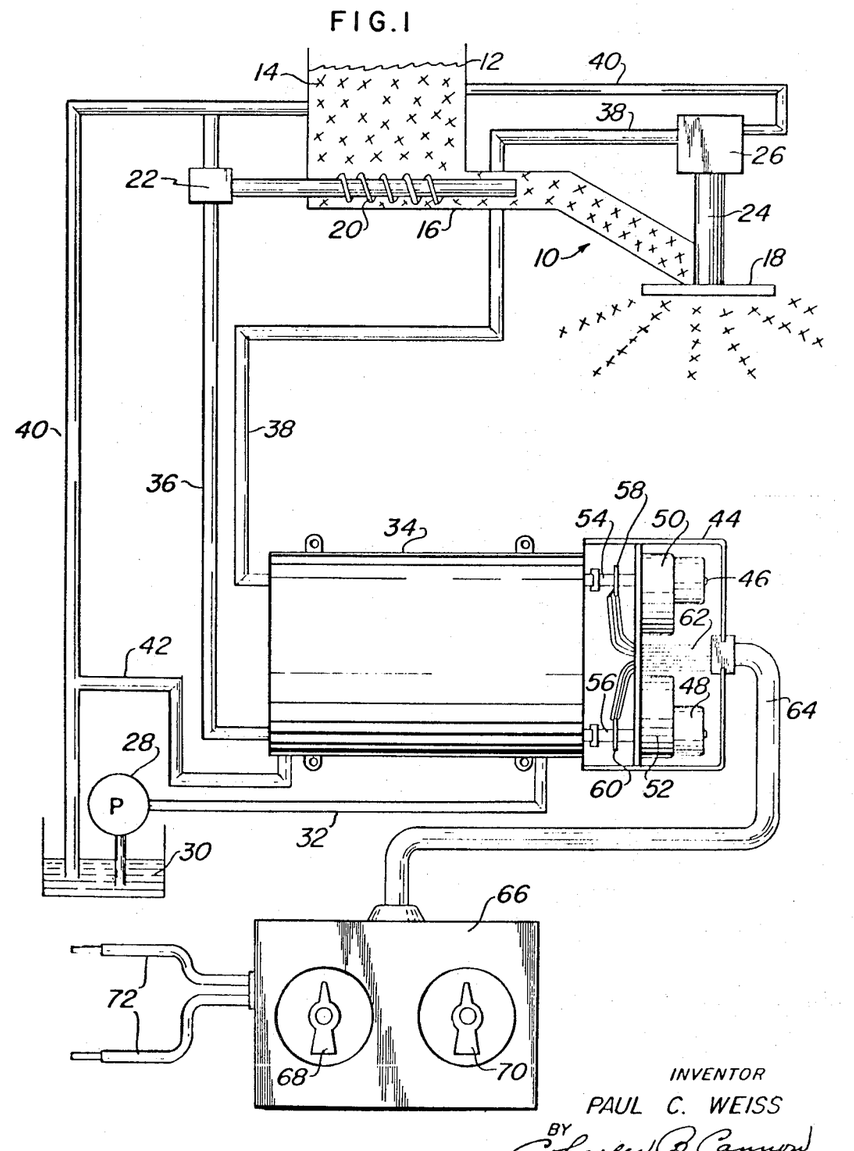
FIG. 1 is a schematic diagram illustrating a spreader system embodying the present invention.

As shown schematically in FIG. 1 there is provided a spreader, indicated generally at 10. The spreader 10 includes a hopper 12 for storing sand or other aggregate material 14. A conveyor conduit 16 extends from the bottom of the hopper 12 to a spreader blade 18. The material 14 is forced along the conduit 16 from the hopper 12 toward the blade 18 by means of an auger type conveyor element 20 which extends along and rotates within the conduit 16.

A hydraulic feed motor 22 drives the conveyor element 20; and the rate at which the motor turns will control the amount of material feed to the blade 18. The blade 18 itself is attached to a drive shaft 24; and this in turn is coupled to be driven from a spreader motor 26. The rate at which the spreader motor 26 turns will control the coverge of the device, i.e., the distance to which the material 14 is thrown.

Hydraulic power for the motors 22 and 26 is supplied from a main hydraulic pump 28 which may be driven by some external source (not shown) such as the engine of the tractor or truck used to move the spreader along. The hydraulic pump 28 draws fluid from a reservoir 30 and pumps it into an inlet terminal 32 of a hydraulic control unit 34. The hydraulic control unit, as will be described more fully hereinafter, selectively and independently controls the flow of fluid out through separate feed motor and spreader motor supply conduits 36 and 38 to operate these two motors. Each of the motors exhausts into a common drain line 40 which returns spent fluid to the reservoir 30. The hydraulic control unit 34 is additionally provided with a direct conduit connection 42 to the reservoir to handle fluid overflow.

The hydraulic control unit 34, as shown, is provided with an actuator cover 44 at its right end. Two electrically driven valve position selector motors 46 and 48 are mounted inside the cover 44. These motors each drive through an associated gear mechanism 50 and 52 to turn an associated valve shaft 54 and 56 which extends into the hydraulic control unit 34. Electrical selector switches 58 and 60 are also mounted in the cover 44; and these switches are provided with movable portions which are turned by the valve shafts 54 and 56. The selector switches 58 and 60 form the slave portions of electrical homing systems which will be described more fully; and they serve to control the rotative position of the motors, and of their associated valve shafts 54 and 56 in accordance with the signals present on various control wires 62 which are connected via a control cable 64 to a remotely located control box 66.

The control box 66 may be located within the cab of the truck or tractor which moves the spreader machinery along. The box 66 is provided with a material feed control knob 68 and a spreader control knob 70. These control knobs can each be set to any of several position; and they operate master switches within the control box to electrically energize selected wires within the control cable 64. A pair of input leads 72 are provided to supply electrical power to the box 66 from an external source (not shown) such as the truck or tractor's electrical system.

In the operation of the above described system, the operator, from a location inside the cab of the truck or tractor on which the system is mounted, adjusts the control knobs 68 and 70 to settings corresponding with desired material feed and spreader speed. The control knob 68 and 70 set the position of electrical switches within the control box 66 and these in turn control the application of current to selected wires within the control cable 64. The current in these wires is applied via the selector switches 58 and 60 to their respective valve position selector motors 46 and 48. These motors turn their associated valve shafts 54 and 56 until the selector switches 58 and 60, which are turned along with these shafts, reach a position such that they no longer pass current from the selected wires to their associated motors. Thus the valve shafts 54 and 56 are rotationally positioned according to the settings of their associated remotely located control knobs 68 and 70. As will be explained more fully hereinafter, the setting of the valve shafts 54 and 56 determines the flow through the conduits 36 and 38 to the feed and spreader motors 22 and 26 and thus determines the speed at which these motors operate. Thus the material feed and spreader blade speed are effectively controlled from a remote location.

Figure 2:
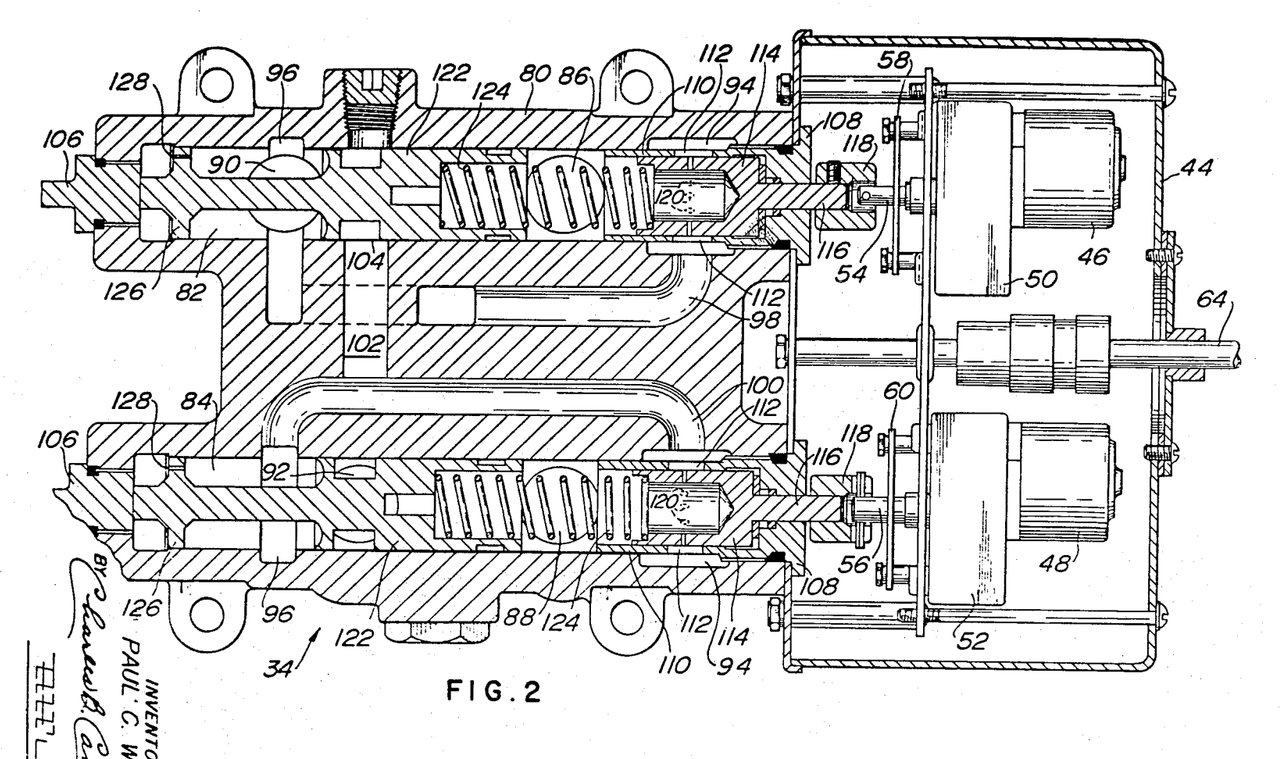
FIG. 2 is an enlarged section view of a hydraulic valve arrangement forming a portion of the system of FIG. 1.

The structural details of the hydraulic control unit 34 are best shown in FIG. 2. As shown, the unit is made up of a housing 80, which may be of cast iron or similar material. The housing 80 is formed with a pair of internal bores 82 and 84 arranged in parallel fashion. The first, or spreader control bore 82 is formed with a spreader outlet port 86 towards its right end as shown in FIG. 2. This outlet port is connected via the spreader motor supply conduit 38 to the spreader motor 26 of FIG. 1. The second or feed control bore 84 is correspondingly formed with a feed outlet port 88 towards its right end; and this outlet port is connected via the feed motor supply conduit 36 to the feed motor 22 of FIG. 1.

An inlet port 90 extends into the spreader control bore 82 toward its left end. This inlet port is connected via the inlet terminal 32 to the pump 28.

A reservoir port 92 extends into the feed control bore 84 near to its midpoint. This reservoir port is connected via the direct conduit connection 42 to the reservoir 30.

Each of the bores 82 and 84 is formed with a forward annular recess 94 and a rearward annular recess 96. A first internal conduit 98 interconnects the recesses 94 and 96 of the spreader control bore 82, while a second internal conduit 100 interconnects the recesses 94 and 96 of the feed control bore 84. The second internal conduit 100 is additionally connected via a crossover passageway 102 to an opening 104 along the spreader control bore 82.

The left end of each of the bores 82 and 84 is closed by means of a threaded plug 106. The opposite ends are each closed by means of a cap member 108 having a sleevelike tubular extension 110 which fits snugly into the bore to a location beyond the forward annular recess 94. The extensions 110 are each provided with openings 112 which communicate between the bore 82 and its associated forward recess 94.

A cup shaped valve element 114 fits closely inside each of the tubular extensions 110. These valve elements are formed with a rod like axial extension 116 which protrudes out through the end of the associated cap member 108 to a coupling 118 by which the valve elements become coupled to the valve shafts 54 and 56. The walls of the cup shaped valve elements 114 are formed with a series of circumferentially distributed openings 120 which vary in size from one to the next. Different ones of the openings 120 come into alignment with the openings 112 in the tubular extensions 110; and thus by selectively rotating the valve elements 114 the size of the opening between the forward or right end of the bores 82, 84 and their respective forward annular recess 94 can be controlled.

A pressure responsive valve spool 122 is also located in each of the bores 82 and 84 and as shown, is urged toward the left end of the bore by means of a compression spring 124. The left end of each spool 122 abuts against its associated plug 106. In this position, the spool 122 of the spreader bore 82 separates the inlet port 90 from the opening 104 to the crossover passageway 102. As the spool 122 moves forward against the spring 124, it uncovers the opening 104 so that the inlet pressure becomes communicated to the second internal conduit 100. At all times, however, the inlet pressure at the inlet port 90 is in communication with the first internal conduit 98. The movement of the spools 122 is damped by means of flanges 126 toward their left ends. These flanges are provided with restricted openings 128 therethrough to restrict oil flow and hence limit the speed of spool movement.

In the second or feed control bore 84, the spool 122 normally separates the rearward annular recess 96 from the reservoir port 92. As the spool moves forward against its spring 124 however, these two openings are placed into communication.

In operation of the above described hydraulic control unit, pressurized fluid from the pump 28 is supplied solely, though continuously to the inlet port 90. Initially this fluid pressure is isolated to the first or spreader control bore 82, and of course, to its associated first internal conduit 98. Fluid will flow through the conduit 98 and through certain of the openings 120 in the associated valve element 114 back into the forward end of the bore 82. From there the fluid can pass out through the spreader outlet port 86 and via the spreader motor supply conduit 38 to the spreader motor 26. The speed of the motor 26 will depend upon the rate of fluid flow and this in turn depends upon the size of the particular valve element openings 120 which happen to be aligned with the tubular extension openings 112.

As fluid passes through the openings 120 it experiences a pressure drop so that the pressure in the right end of the bore 82 becomes less than that at the left end. Consequently the valve spool 122 moves rightwardly against its compression spring 124. This opens the crossover passageway 102 to the inlet port 90 and thus places the feed control bore 84 and its associated second internal conduit 100 into communication with the high pressure inlet conduit 90. Pressurized fluid then flows through the second internal conduit 100 and through certain of the openings 120 in the associated valve elements 114 into the forward end of the bore 84. The fluid then passes out through the feed outlet port 88 and along the feed motor supply conduit 36 to the feed motor 22. As in the case of the spreader motor 26, the feed motor 22 operates at a speed corresponding to the rate of fluid flow through its supply conduit and this in turn depends upon which of the various size openings 120 of the associated valve element 114 are caused to be aligned with the tubular extension openings 112.

It will be appreciated that the above described hydraulic control unit operates to provide selective control of the speeds of the feed and spreader motors 22 and 26 and that the speed of each motor is determined by the rotational position of its associated valve element 114. This, as will be described more fully hereinafter, is remotely controlled from the control box 66.

An important aspect of the above described hydraulic control unit lies in the unique inter-relationship it provides between the spreader and feed controls. These controls are basically independent of each other. Yet, because of the particular valve and conduit arrangement used herein, the feed motor will not operate until the spreader motor has attained a given speed. Furthermore should the speeds of both motors exceed a critical limit, the fluid flow to them will automatically be reduced.

These important advantages are achieved in the present system by virtue of the two valve spools 122. As pointed out above, no fluid can flow through the feed control bore 84 until the valve spool 122 in the spreader control bore 82 has moved forward to open the crossover passageway 102. Thus the feed motor 22 receives no driving fluid until this occurs. The valve spool 122 in the spreader control bore 82 will not move until a sufficient pressure differential is built up across it. This in turn depends upon the fluid pressure drop which occurs across the openings 120 in the valve control element 114 of the spreader control bore 82. When this pressure reaches a sufficient level, the net fluid force on the associated valve spool 122 in the bore 82 will suffice to move it rightwardly and open the crossover passageway 102. The pressure drop across the openings 120 depends, of course, upon the rate of fluid flow through them; and this in turn is governed by the speed of the spreader motor 26. Thus the feed motor 22 will not operate until the spreader motor 26 has attained a predetermined speed. It should also be noted that the predetermined speed which the spreader motor must attain in order to initiate operation of the feed motor differs for each setting of the spreader motor speed control. This is because movement of the valve spool 122 depends upon the pressure differential across it, which is actually the same as the pressure drop across the openings 120 in the associated valve element 114. When a larger opening is used, it will accommodate a greater flow for a given pressure drop. Thus when the spreader motor is set to a given speed by the control knob 70, the feed motor will not begin to operate until the spreader motor has attained the speed to which is was set. Conversely, should the spreader motor fall below the speed to which it was set, then the valve element 122 in the spreader control bore 82 will move leftward and cut off fluid flow to the feed control motor, thus stopping it. The above action is very desirable for it ensures that material will not be fed to the spreader unless and until the spreader is operating at a sufficient speed to properly distribute the material.

Further, when the speed of the feed motor 22 exceeds a predetermined rate then the pressure drop across the openings 120 of the valve element 114 in the feed control bore 84 will become great enough to develop a pressure differential across the associated valve spool 122 to cause it to shift in the rightward direction. When this occurs the reservoir port 92 is opened and excess fluid is diverted back through this opening and the conduit connection 42 to the reservoir 30.

As stated above, the speeds of the feed and spreader motors are controlled according to the rotational positions of the two valve elements 114. These in turn are remotely controlled by the special wiring and switching arrangement including the control box 66.

Figure 3:
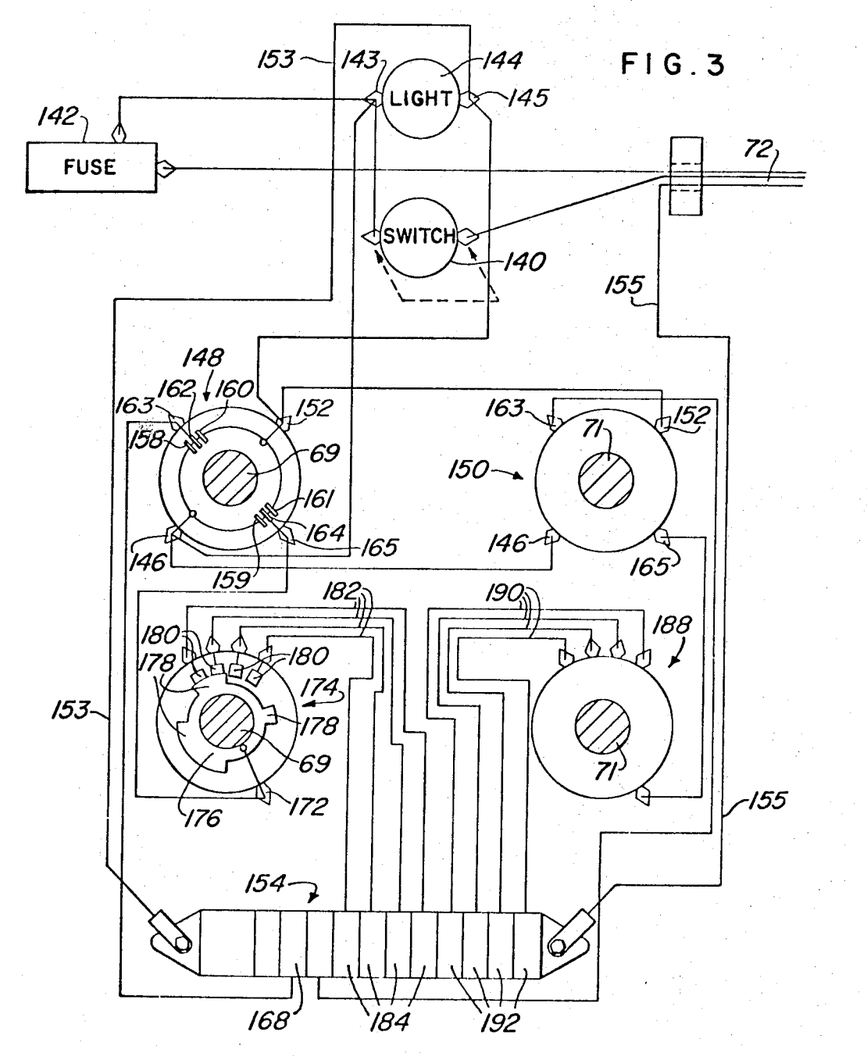
FIG. 3 is a schematic diagram illustrating the electrical connections in a remote control box forming a portion of the system of FIG. 1.
Figure 4:
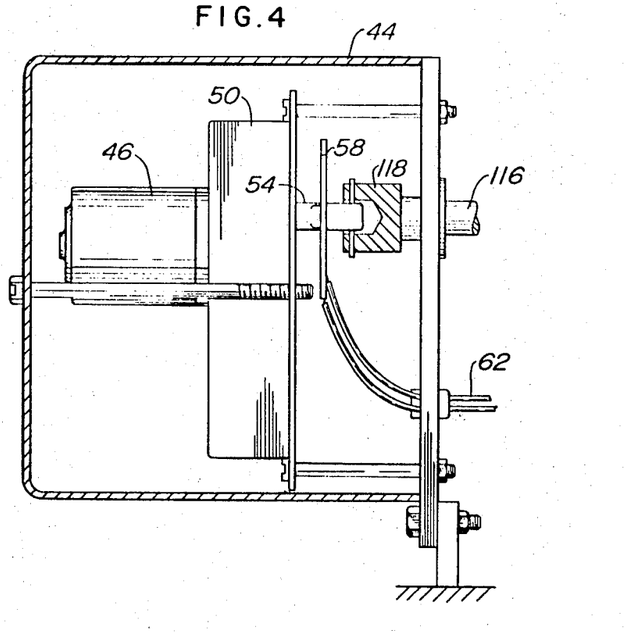
FIG. 4 is an enlarged side view of the interior of the electrical drive forming another portion of the system of FIG. 1.

The switch and wiring set up of the control box 66 is schematically illustrated in FIG. 3. As there shown, electrical power in the form of direct current is supplied via the leads 72. One of these leads is connected through a fuse 142 to a first terminal 143 of an operating light 144, and to one terminal of a master switch 140.

The first terminal 143 of the operating light 144 is additionally connected to a first input terminal 146 of each of two double throw polarity reversing switches 148 and 150. Basically the purpose of these polarity switches is to control the direction of operation of the valve position selector motors 46 and 48. A second terminal 145 of the operating light 144 is connected to a second input terminal 152 of each of the two polarity switches 148 and 150. The second terminal 145 is also connected via a lead 153 to a terminal socket assembly 154, and from this assembly back through another lead 155 to another of the input leads 72.

The mechanical details of the polarity switches 148 and 150 will be described more fully hereinafter. As shown schematically in FIG. 3, however, their electrical arrangement is such that each of the two input terminals 146 and 152 is electrically connected to two contacts (158 and 159 in the case of input terminal 146; and 160 and 161 in the case of input 152). The contacts 158 and 160 are arranged close to and on opposite sides of a first output contact 162 while the contacts 159 and 161 are arranged close to and on opposite sides of a second output contact 164. The contact 162 is connected to a first output terminal 163 while the other output contact 164 is connected to a second output terminal 165. The input contacts 158, 159, 160 and 161 are maintained positionally fixed relative to each other, but they are frictionally mounted on central shafts 69 and 71 which are rotated respectively by the control knobs 68 and 70.

Thus, for example, when the control knob 68 is turned in a clockwise direction, the movable contact 158 will touch the stationary contact 162 and the movable contact 161 will touch the stationary contact 164. Because of the frictional arrangement to be described hereinafter, these contacts will begin to slip immediately after touching each other so that they will remain in touching position over the entire distance when the knob is turned. On the other hand, should the knob 68 be turned in a counterclockwise direction, the movable contact 160 will touch the stationary contact 162 while the movable contact 159 will touch the stationary contact 164 and these various contacts will remain in touching position irrespective of how far in a counterclockwise direction the knob 68 is moved. They will remain touching until the knob 68 is again turned in a clockwise direction. It will be appreciated from the above that by turning the knob 68 in either a clockwise or a counterclockwise direction, the connection between the input terminals 146 and 152 and the output terminals 163 and 165 is effectively reversed. Similarly, in regard to the feed polarity switch 150, the electrical positions of the input terminals 146 and 152 are effectively reversed with respect to the output terminals 163 and 165 merely by initiating a turning movement of a control knob 70.

The output terminals 163 and 165 of the spreader polarity switch 148 are connected respectively to a first terminal position 168 of the terminal plug 154 and to a common input terminal 172 of a spreader position switch 174. The spreader position switch 174 includes a rotatable switch plate 176 which is turned by turning movement of the control knob 68. The rotatable switch plate 176 is formed with a plurality of contact elements 178 arranged in a coded pattern about its circumference. These contacts 178 are arranged to touch one or more of several output contacts 180 in different combinations thereof depending upon the rotatable position of the switch plate 176. As shown, the common input terminal 172 is permanently connected to the rotatable switch plate 176. The various output contacts 180 are each connected to associated position selector wires 182 and these in turn are connected to associated terminals 184 of the terminal connector plate 154. The various internal wires 62 of the control cable 64 (FIG. 1) are connected to corresponding terminals on the terminal socket 154; and from these terminals to proper associated switch terminals in the control box 6.

The shaft 71 of the control knob 70, which operates the feed polarity switch 150, also turns a rotatable switch plate (not shown) of a feed position switch 188. The construction and operation of the feed position switch 188 is identical to that of the spreader position switch 174. Like the spreader position switch, it is provided with a plurality of position selector output wires 190 which are connected to corresponding terminals 192 on the terminal socket 154. Also, the wires 190 are connected to associated wires 62 within the control cable 64.

Figure 5:
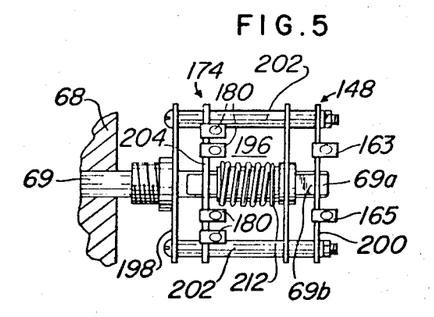
FIG. 5 is a side view of a control knob and switch arrangement forming a portion of the interior of the control box of the system of FIG. 1.

Turning now to FIG. 5, there is shown the mechanical construction of the polarity switch 148 and the spreader position switch 174. As shown in FIG. 5, the two switches 148 and 174 are arranged in axial alignment with the control knob shaft 69 extending through each of them. The switches are held together on a frame assembly 196. This frame assembly is made up of front and back plates 198 and 200 held in spaced relationship by means of elongated bolts 202. A terminal plate 204 is mounted between the front and back plates 198 and 200 and is provided at its periphery with the output contacts 180. The rotatable switch plate 176, as indicated previously, is mounted on the shaft 69 to turn therewith and to press against certain selected contacts on the terminal plate 204. The back plate 200 has mounted thereon the output terminals 163 and 165 of the polarity switch portion 148. The input terminals 146 and 152 are in turn connected to a rotatable plate (not shown) which is mounted on and rotatable with the right end of the shaft 69a.

Figure 6:
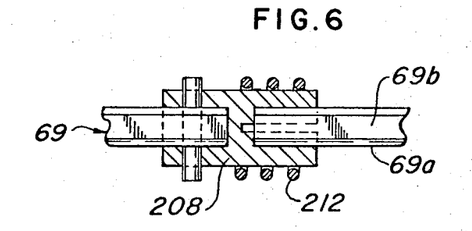
FIG. 6 is an enlarged view of a frictional connector forming a portion of the switch arrangement of FIG. 5.

As can be seen in FIG. 5, the shaft 69 is actually a composite structure and is formed with a frictional coupling arrangement which is shown in greater detail in FIG. 6. As can be seen in FIG. 6, the coupling arrangement comprises a bifurcated connector 208, one end of which is attached at 210 to the shaft 69 and the bifurcated end of which slips over an extensiond 69a of the shaft 69. A coil spring 212 is stressed over the bifurcated end to bear inwardly against the shaft extension 69a so that a frictional coupling is effected between the element 208 and the extension 69a. When the shaft 69 turns, the element 208 will cause the extension 69a to turn until a resistance to further turning is encountered. Similarly when the shaft 69 is turned in the opposite direction, the extension 69a will be carried in the opposite direction until a further resistance is offered to movement. The shaft extension 69a is held to limit rotational movement by means of the back plate 200. It will be noted from FIG. 6, that the extension 69a is provided with flattened sides 69b and these flattened sides fit loosely within a correspondingly shaped opening through the back plate 200. This allows the extension 69a to turn but slightly with respect to the back plate 200. This small amount of turning movement is sufficient to cause the various contacts to touch each other in both directions of movement.

Figure 7:
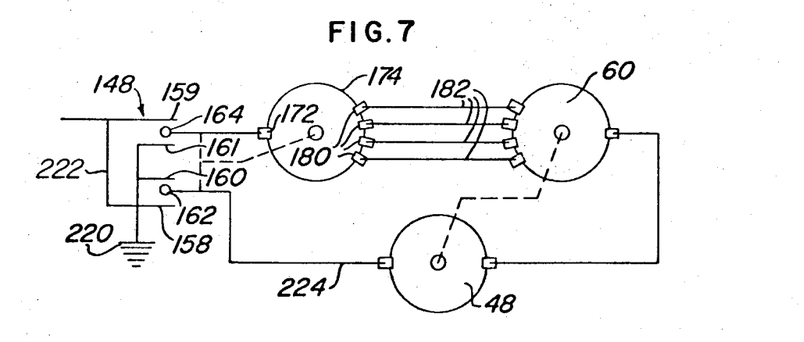
FIG. 7 is an overall electrical schematic of the system of FIG. 1.

FIG. 7 illustrates the overall circuit configuration of the switching system. As there shown, the polarity reversing switch 148 has its input terminals connected between ground 220 and voltage supply terminal 222. The output terminals 162 and 164 are effectively reversible by means of the above described double throw polarity reversing switches 148 and 150. That is, the application of ground and finite potential can be reversed with respect to these two terminals. The first terminal 164 is connected via the position selector switch 174 and through the control cable 64 to its corresponding slave selector switch 60. The output of the slave selector switch 60 is connected to the switch motor 48 which in turn is mechanically connected to turn the slave selector switch and at the same time turn the valve stem 56. The circuit connection to the motor is completed via another line 224 through the control cable 64 to the other input terminal 162 of the polarity switch 148.

Figure 8:
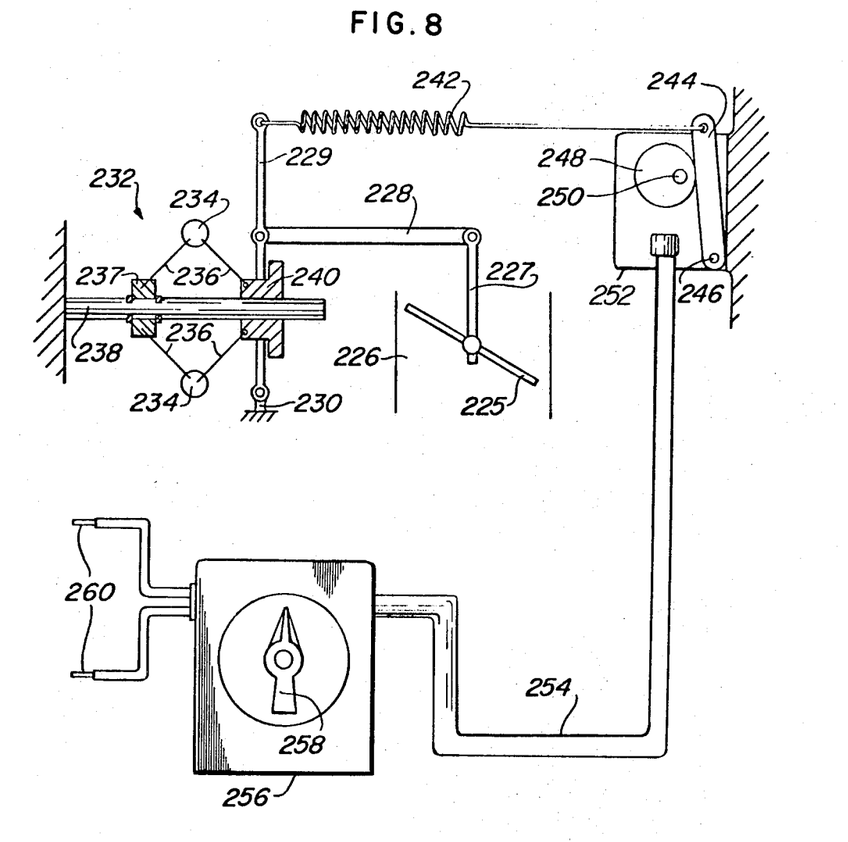
FIG. 8 is a diagrammatic view of an engine speed control forming a second embodiment of the present invention.

Referring now to FIG. 8, an example of the present invention as adapted to be used in connection with a speed control for an internal combustion engine will now be described.

As seen in FIG. 8, there is provided a butterfly valve 225 arranged in a carburetor feed passage 226 to an internal combustion engine (not shown). The butterfly valve 225 is controlled by means of a crank arm 227 and link member 228 to a control arm 229. The control arm 229 is pivotally mounted at one end to a fixed pivot element 230 so that as the control arm 229 moves in a clockwise direction, it will cause the butterfly valve 225 to open; and as it moves in a counterclockwise direction, the butterfly valve 225 will close. Movements of the control arm 229 are basically controlled by means of a centrifugal control device 232. This control device comprises a plurality of fly balls 234 mounted on pivotal linkages 236 to be rotated about an output shaft 238 which is turned by the engine being controlled. One end of the linkages 236 is fixed to the output shaft 238 by means of a fixed element 237; while the other end is connected to a rotatable coupling element 240 which is freely slidable in a longitudinal direction on the output shaft 238. Thus as the shaft 238 rotates at greater and greater speeds, fly balls 234 attempt to move in a radially outward direction and via the linkages 236 they tend to pull the rotatable coupling element 240 in toward the fixed element 237. The rotatable coupling element 240 is arranged to urge the control arm 229 in a counterclockwise direction as the fly balls 234 move outwardly. The upper end of the control arm 229 is connected by means of a tension spring 242 to one end of a remote control arm 244 the other end of the remote control arm is mounted at a fixed pivot 246. An eccentric cam element 248 is mounted to rotate about a fixed axis 250; and is coupled to a remote control positioning device 252 such as is used to achieve valve stem positioning in the system of FIGS. 1–7.

The remote positioning device 252 is connected by means of a control cable 254 to a remote control box 256 having a control knob 258 mounted thereon. A pair of input wires 260 is provided for supplying electrical power to the system.

The above described system operates in the following manner. The control knob 258 is set to a desired engine speed. This in turn sends properly coded signals through the control cable 254 to the remote control positioning device 252. This in turn turns the cam 248 about its fixed axis 250 so that it pushes against the remote control arm 244 acusing it to assume a certain rotational position. This in turn pulls on the tension spring 242 thus increasing the force supplied to rotate the control arm 229 in a clockwise direction. The engine will operate until it attains a speed such that the action of the fly balls 234 operating through the rotatable coupling 240 on the control arm 229 is sufficient to precisely counterbalance the force produced in the other direction through the tension spring 242. This in turn will establish the position of the link member 228 and the crank arm 227 so that the butterfly valve 225 is set to achieve a precise engine speed. The engine speed can, of course, be varied from a remote position simply by turning the control knob 258 so that the cam element 248 turns and changes the tension exerted through the spring 242.

Figure 9:
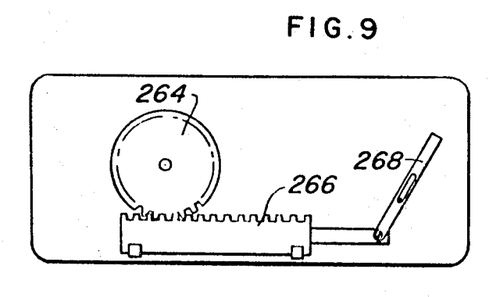
FIG. 9 is a fragmentary view showing a possible modification to a portion of the embodiment of FIG. 8.

FIG. 9 shows a modification to the above described engine control system. According to the arrangement of FIG. 9, there is provided instead of the cam and followed arrangement of FIG. 8, a rack and pinion arrangement comprising a remotely positioned pinion gear 264 which meshes with a longitudinally movable rack member 266. The rack member in turn is connected via a link arm 268 to the tension spring 242. As the pinion gear is remotely positioned to a given setting, it in turn causes the rack to assume a corresponding longitudinal position and this in turn controls the amount of tension exerted on the tension spring 242 to control the desired speed setting of the engine.

Having thus described the invention with particular reference to the preferred forms thereof, it will be obvious to those skilled in the art to which the invention pertains, after understanding the invention, that various other changes and modifications may be made therein without departing from the spirit and scope of the invention, as defined by the claims appended thereto.

What is claimed as new and desired to be secured by Letters Patent is:

1. A spreader system comprising a hopper for containing material to be distributed; a rotating blade spreader for distributing said material; a conveyor including drivable conveying means for feeding material from said hopper to said spreader; separate hydraulic motor means drivably engaged with said conveying means and said spreader respectively; a hydraulic pump; means including a valve arrangement connecting the output of said pump to each of said hydraulic motor means, said valve arrangement including separate flow channels and in individually controllable valve elements for selectively and independently adjusting the flow to each of said hydraulic motor means; a separate electric motor coupled to drive each of said individually controllable valve elements; and a separate remote control circuit coupled each to a different one of said motors for controlling the conveyor and spreader from a remote location; each of said control circuits independently including: a first multi-position switch coupled to the corresponding motor to be operated thereby, a second, remotely located, multi-position switch, manual means coupled thereto for changing the position of said second switch, means electrically interconnecting said first and second switches for providing a closed series circuit through both switches whenever said two switches are out of predetermined positional relationship and interrupting said series circuit when said two switches are in said predetermined positional relationship, first and second terminals for connection, respectively, to opposite poles of a direct current source, a polarity reversing switch, and means connecting said series circuit and said corresponding motor in series through said polarity reversing switch between said first and second terminals whereby current from said terminals will flow through said multi-position switches and motor in one direction when said polarity reversing switch is in one position and in the opposite direction when said reversing switch is in another position, said second multi-position switch being coupled to said reversing switch for shifting the position of the reversing switch only when said second multi-position switch is manipulated in a direction opposite to its immediately previous direction of manipulation.

2. A system for remotely controlling the speed of a fluid engine, said system comprising engine speed responsive means for producing a force in a given direction proportional to engine speed, a linkage mechanism interconnecting said engine speed responsive means and a throttle which controls the flow of fluid to said engine, spring restraining means connected to oppose the force produced by said engine speed responsive means, a rotatable member, means interconnecting said rotatable member to one end of said spring restraining means to vary the stress on said spring restraining means, the other end of said spring restraining means being connected to said engine speed responsive means whereby the rotational position of said rotatable member will control the opposition afforded by said spring means to said speed responsive means, and an arrangement for controlling the position of said rotatable member; said arrangement including an electric motor operatively coupled in driving relation to said rotatable member, a first multi-position switch coupled to said motor for operation thereby, a second, remotely located, multi-position switch, manual means coupled thereto for changing the position of said second switch, means electrically interconnecting said first and second switches for providing a closed series circuit through both switches whenever said two switches are out of a predetermined positional relationship and interrupting said series circuit when said two switches are in said predetermined positional relationship, first and second terminals for connection, respectively, to opposite poles of a direct current source, a polarity reversing switch, and means connecting said series circuit and said motor in series through said polarity reversing switch between said first and second terminals whereby current from said terminals will flow through said multi-position switches and motor in one direction when said polarity reversing switch is in one position and in the opposite direction when said reversing switch is in another position, said second multi-position switch being coupled to said reversing switch for shifting the position of the reversing switch only when said second multi-position switch is manipulated in a direction opposite to its immediately previous direction of manipulation.

3. A system as in claim 2 wherein said means interconnecting said rotatable member to one end of said spring restraining means comprises a pivotal arm, the free end of which is connected to said spring restraining means, and a cam rotatable against said arm by said rotatable member to control the position of said free end.

4. A system as in claim 2 wherein said means interconnecting said rotatable member to one end of said spring restraining means comprises a pinion gear turned by said rotatable member and a rack meshed with and movable longitudinally upon rotation of said pinion gear, said rack being connected to said one end of said spring restraining means.

References Cited
UNITED STATES PATENTS 3,344,993   10/1967   Wilder et al. _______ 239—677 X LLOYD L. KING, Primary Examiner U.S. Cl. X.R.

239—681; 251—131

UNITED STATES PATENT OFFICE
CERTIFICATE OF CORRECTION

Patent No. 3,615,056      Dated October 26, 1971

Inventor(s) PAUL C. WEISS

It is certified that error appears in the above-identified patent and that said Letters Patent are hereby corrected as shown below:

By correcting the name of the assignee (Column 1) to read correctly as--Ambac Industries Incorporated, a New York corporation.

Signed and sealed this 2nd day of May 1972.

(SEAL)
Attest:

EDWARD M. FLETCHER, JR.          ROBERT GOTTSCHALK
Attesting Officer                 Commissioner of Patents

ORM PO-1050 (10-69)